US006487375B2

United States Patent
Ferrer et al.

(10) Patent No.: US 6,487,375 B2
(45) Date of Patent: Nov. 26, 2002

(54) SYSTEM TO COMMUNICATE INFORMATION FROM A PLURALITY OF MACHINES TO A REMOTELY LOCATED RECEIVER

(75) Inventors: Gabriel E. Ferrer, Ontario, NY (US); Bernard Leibman, Webster, NY (US)

(73) Assignee: Xerox Corporation, Stamford, CT (US)

( * ) Notice: Subject to any disclaimer, the term of this patent is extended or adjusted under 35 U.S.C. 154(b) by 14 days.

(21) Appl. No.: 09/749,691

(22) Filed: Dec. 28, 2000

(65) Prior Publication Data

US 2002/0085846 A1 Jul. 4, 2002

(51) Int. Cl.[7] .............................................. G03G 15/00
(52) U.S. Cl. ......................... 399/8; 340/3.44; 340/307; 340/500; 340/539; 399/9
(58) Field of Search .............. 399/8, 11, 9; 340/286.01, 340/286.02, 287, 307, 3.1, 3.43, 3.44, 500, 539; 79/350, 352, 353, 354, 360, 361

(56) References Cited

U.S. PATENT DOCUMENTS

| | | | | |
|---|---|---|---|---|
| 3,813,655 A | * | 5/1974 | Allen et al. | |
| 4,237,454 A | * | 12/1980 | Meyer | 240/539 |
| 4,630,035 A | * | 12/1986 | Stahl et al. | 340/307 |
| 4,777,474 A | * | 10/1988 | Clayton | 340/539 |
| 5,016,059 A | * | 5/1991 | Smeiman | 399/8 |
| 5,084,875 A | | 1/1992 | Weinberger et al. | |
| 5,164,767 A | * | 11/1992 | Suzuki | 399/8 |
| 5,369,469 A | * | 11/1994 | Leo et al. | 399/8 |
| 5,398,257 A | * | 3/1995 | Groenteman | 399/8 |
| 5,414,494 A | | 5/1995 | Aikens et al. | |
| 5,440,301 A | | 8/1995 | Evans | |
| 5,524,185 A | | 6/1996 | Na | |
| 5,666,010 A | * | 9/1997 | Stratiotis | |
| 5,809,363 A | * | 9/1998 | Kitamura et al. | 399/11 |
| 5,822,221 A | * | 10/1998 | Groenteman | 399/8 |
| 5,907,491 A | * | 5/1999 | Canada et al. | 340/3.1 |
| 5,966,636 A | * | 10/1999 | Corrigan et al. | |
| 6,114,955 A | * | 9/2000 | Brunius et al. | 340/286.02 |
| 6,225,901 B1 | * | 5/2001 | Kail, IV | 340/539 |
| 6,243,010 B1 | * | 6/2001 | Addy et al. | 340/3.1 |
| 6,317,039 B1 | * | 11/2001 | Thomason | 340/539 |

FOREIGN PATENT DOCUMENTS

| | | | |
|---|---|---|---|
| EP | 0994578 A2 | * | 4/2000 |
| JP | 07123190 | * | 5/1995 |

* cited by examiner

Primary Examiner—Susan S. Y. Lee
(74) Attorney, Agent, or Firm—Oliff & Berridge, PLC

(57) ABSTRACT

The invention provides automatic machinery with the capability to communicate to an operator or technician or other machine user with a description of a machine condition, such as, for example, a machine problem, if the machine requires attention.

25 Claims, 3 Drawing Sheets

SYSTEM TO COMMUNICATE INFORMATION FROM A PLURALITY OF MACHINES TO A REMOTELY LOCATED RECEIVER

BACKGROUND OF THE INVENTION

1. Field of Invention

This invention relates to communicating diagnostic information about machines and systems to an operator, technician or other user.

2. Description of Related Art

U.S. Pat. No. 5,414,494, to Aliens, et al., incorporated herein by reference in its entirety, discloses a method of automatic notification of diagnostic information concerning status and condition of a copy machine to selected remote devices. During operation of the copy machine, a controller continually scans and monitors appropriate memory locations for selected conditions, such as, for example, various jam and malfunction conditions or recorded cumulative numbers of such conditions. When a particular condition or threshold is reached as a result of machine control monitoring of the machine sensors and switches, or a coincidence of present machine conditions with stored reference or reporting conditions occurs, the copy machine will trigger an automatic transmission or notification to selected remote stations. Upon detecting any given condition, such as an out of paper condition, a predetermined fault condition, or an end of job, the machine automatically initiates a call to a pager using a modem, then sends one or more coded message to the pagers, including codes which represents the condition diagnosed.

U.S. Pat. No. 5,084,875 to Weinberger discloses a system for automatically and remotely monitoring the operational status of one or more copy machines to permit identifying copiers with operational problems to create service requests for those copy machines. Weinberger uses a central processing unit which is remotely located from the copiers in a separate computer.

SUMMARY OF THE INVENTION

In various exemplary embodiment of the systems and methods according to this invention, in which a single machine is used, a diagnostic machine condition signal is generated for a plurality of different conditions. Each different condition or category of conditions is transmitted to a user on a different frequency. The signals may be modulated to carry voice messages or codes for radio receivers and voice and/or written messages for pagers.

A machine user or technician can be provided with a transceiver in the form of a headset, with earphones, and possibly a microphone. In this manner, a user or technician can listen to a voice message. If the user is provided with a microphone, the user can send a voice message, or other control signal, back to the machine to cause a change in the condition detected or otherwise affect the machine such as, for example, to turn off the machine or a portion of the machine or have the machine run self-diagnostic tests. Alternatively, the user or technician can simply go to the machine and manually address the condition the machine apprised the user or technician of. In other exemplary embodiments, a wireless telephone may be used if the transmitter is fitted with an automatic dialing and message unit which plays a message to the user or technician after the user or technician answers the telephone, whether the telephone is wired or wireless. If a pager is used, then a message can be sent to the pager for viewing by the user or technician.

When plural machines are involved, each machine may be provided with a transceiver. Each machine's transceiver may operate at a different frequency or group or frequencies from the other machines to provide a method of identifying which machine's signal is being received by a user or technician. Additionally, each condition diagnosed and transmitted to a user or technician may additionally operate at a different frequency. The different condition frequencies will differ for each machine but will be within the unique range of frequencies transmitted by a particular machine.

In various other exemplary embodiments of the systems and methods according to this invention, a transmission frequency is selected to (1) select the status or identity of the recipient, such as, for example, an operator, a technician, or some other user, based on the type of attention needed by the machine, (2) the priority of, attention needed by the machine, (3) the location of an available attention provider, and/or (4) to reduce or avoid interference among transmission frequencies.

In various other exemplary embodiments of the systems and methods according to this invention, the machines are allowed to communicate with each other so that, for example, a machine closest to a machine user or technician may be used to transmit and/or display operational information from another machine. Alternatively, in various other exemplary embodiments, one or more machines are selected to receive diagnostic information signals from other machines and configured to more effectively or efficiently transmit that information to a user or technician. The one or more selected machines can also be configured to send signals to the other machines from which diagnostic information is received, for example, to turn the other machines off, place the other machines in a standby status, or to have the other machines perform self-maintenance procedures.

This invention is not limited to a wired connection between the machines and a user terminal and is not limited to using a wireless pager. For example, various exemplary embodiments of the systems and methods of this invention use cellular phones, modems, loud speakers, and/or alarms, as well as pagers and modems.

In various other exemplary embodiments of the systems and methods according to this invention, a machine user or technician is provided with a frequency scanner S to monitor all of the frequency transmission channels of the machines, so that the user or technician will almost immediately be aware of a diagnostic information signal being sent from one or more of the machines as well as the nature of the condition being diagnosed. However, where a single signal transceiving machine is used to communicate with the other machines and is the only machine which sends a signal to a machine user or technician, a scanner need not be used unless the single signal transceiving machine users more than one transmitting frequency.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of this invention will be detail, with reference to the following figures, wherein.

DETAILED DESCRIPTION OF EXEMPLARY EMBODIMENTS

Figure 1:
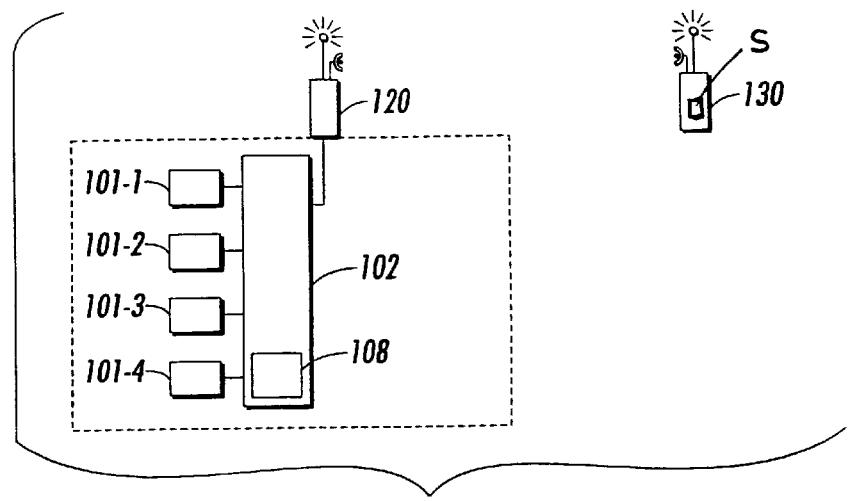
FIG. 1 is a schematic diagram of a first exemplary embodiment of a system according to this invention, including a machine showing a plurality of sensors, a controller, a transmitter and a receiver, and a mobile transmitter and receiver.

FIG. 1 shows a machine 100 such as, for example, a photo copy machine 100, with a plurality of sensors 101. The sensors 101 are connectable to a controller 102. When the controller 102 receives a signal from a sensor 101, the controller 102 generates a second signal based on the signal it received from that sensor 101. The second signal generated by the controller can be in many forms, such as, for example, a voice message corresponding to the aspect or condition of the machine 100 which was sensed by that sensor 101.

A message encoder 108 is provided with each machine 100 either as part of, or connectable to, the controller 102 to provide an encoded message, which indicates pertinent information, to the operator or technician, such as, for example, what aspect of the machine 100 has been sensed, what needs to be done to the machine 100 and the like.

Figure 5:
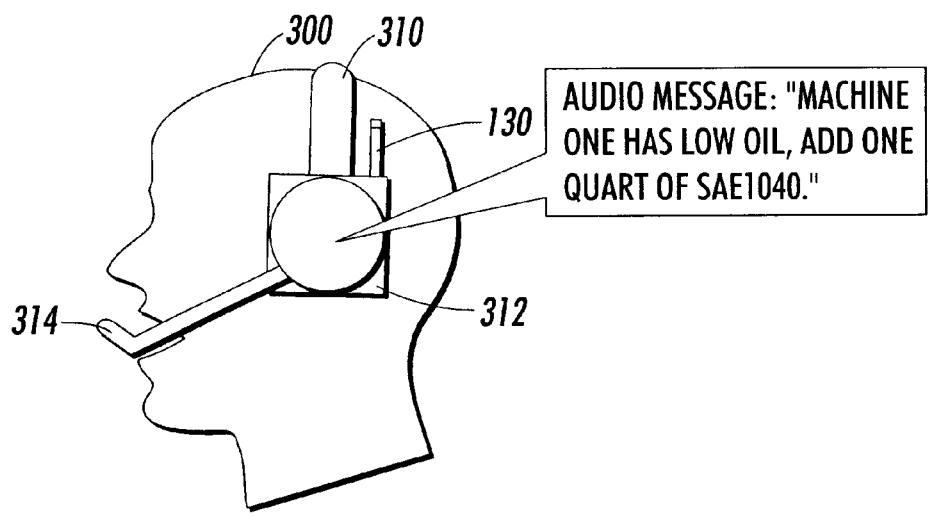
FIG. 5 depicts a first exemplary embodiment of the receiver usable in the first-fourth exemplary embodiments of a system according to this invention, including a machine user using a mobile transmitter and receiver in the form of earphones.

A transmitter 120 or a transmitter-receiver 120 is connectable to the controller 102. The transmitter or transceiver 120 receives the second signal generated by the controller 102 and encoded by the message encoder 108 and transmits the received second signal on a radio frequency or on some other electromagnetic frequency. FIG. 1 also shows a mobile receiver 130 or a mobile transmitter-receiver 130 which is located separately and apart from the machine 100. The receiver or transceiver 130 may be of any size but, in various exemplary embodiments, as shown in FIG. 5, is small enough to be easily carried or worn by a machine operator or technician. The transceiver 120 on each machine 100 may, for example, transmit at a different frequency from the transmitters on the other machines 100, so that each machine 100 may be readily identified by the frequency of the signal transmitted to the operator or technician. Because each machine 100 may be configured to transmit at a different frequency or group of frequencies, an operator or technician may receive any one of many simultaneously generated signals the received signals distorting or interfering with each other. When a different set of transmission frequencies is used for each machine 100, those different frequencies may be selected from or otherwise used to select the status or identity of the recipient, i.e., the operator, a technician or some other user, based on the type of attention needed by the machine 100, the priority of needed attention, the location of an available attention provider, such as the operator or a technician, and/or to reduce or avoid interference between the transmission frequencies.

Figure 2:
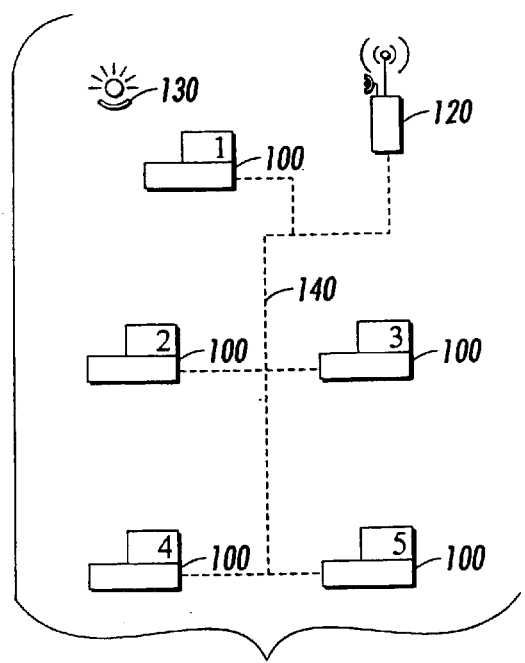
FIG. 2 depicts a second exemplary embodiment of a system according to this invention, including a centralized multi-machine in which each machine communicates with a single transmitter and receiver.

FIG. 2 shows a second exemplary embodiment of a system according to this invention that uses a centralized transmission scheme. As shown in FIG. 2, the system includes a number of machines 100-1 through 100-5, each of which is connected to a central transmitter or transceiver 120. The exemplary embodiment shown in FIG. 2 uses the centralized transmitter or transceiver 120 to convey diagnostic machine condition signals, i.e., signals of the machines 100-1 to 100-5, to the user or to a technician. The centralized transmitter or transceiver 120 eliminates the need to provide each machine 100-1 to 100-5 with its own transmitter or transceiver 120, and reduces the cost implementing systems according to this invention. In various exemplary embodiments, the transmitter or transceiver 120 transmits at a number of different frequencies, where at least one frequency is associated with each of the machines 100-1 through 100-5. Because a different transmission frequency is used for each machine 100-1 through 100-5, a user or technician to whom the signals are transmitted can determine which machine 100-1 through 100-5 has sent a diagnosed condition signal based at least on the transmission frequency. The signal from each machine 100-1 to 100-5 and transmitted by the centralized transmitter or transceiver 120 can include information provided by the message encoder 108 not only about the diagnosed condition, but also about the location of the machine 100, so an operator or technician can easily locate the machine 100 to attend to it. One other independent advantage of the centralized transmitter or transceiver 120 is that the centralized transmitter or transceiver 120 can be portable and can fit in locations in which an entire machine 100 could not fit.

Figure 3:
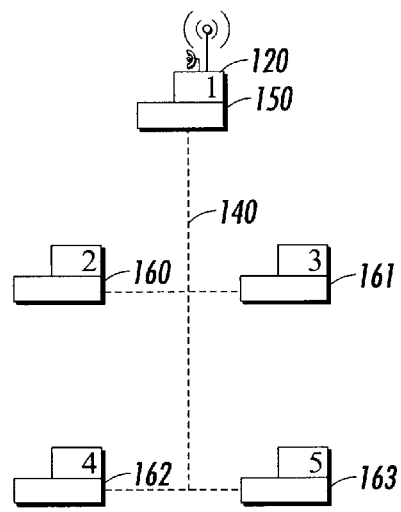
FIG. 3 depicts a third exemplary embodiment of a system according to this invention, including a centralized multi-machine embodiment in which one machine contains a transmitter and receiver, and several slave machines.

FIG. 3 shows a third exemplary embodiment of a system according to this invention that also uses a centralized transmission scheme. In FIG. 3, one of the machines 150 and 160–163 is designated as a master machine 150, while the other machines 160–163 are designated as slave machines 160–163. In particular, only the master machine 150 includes a transmitter or transceiver 120. The slave machines 160–163 transmit their diagnostic condition signals to the master machine 150, which sends a signal to the operator or technician using the transmitter or transceiver 120. The signal transmitted by the master machine 150 contains enough information to identify which of the master machine 150 or one of slave machines 160–163 generated the diagnostic condition signal. In various exemplary embodiments, this machine identification information is the specific frequency on which the signal was transmitted by the transmitter or transceiver 120 associated with the master machine 150.

The slave machines 160–163 can be connected to the master machine 150 by hard wiring or wirelessly, i.e., by using electromagnetic radiation such as, for example, radio waves. In the case of wireless communication, each slave machine 160–163 and the master machine 150 has a separate transceiver by which these machines 150 and 160–163 communicate with each other. The master machine 150 not only sends information to a user or technician, but can also send a signal to any slave machine 160–163 to trigger an action, such as, for example, a shutdown routine, a circuit disconnect, or other action such as, for example, initiation of an alarm by that one of the slave machines 160–163.

Figure 4:
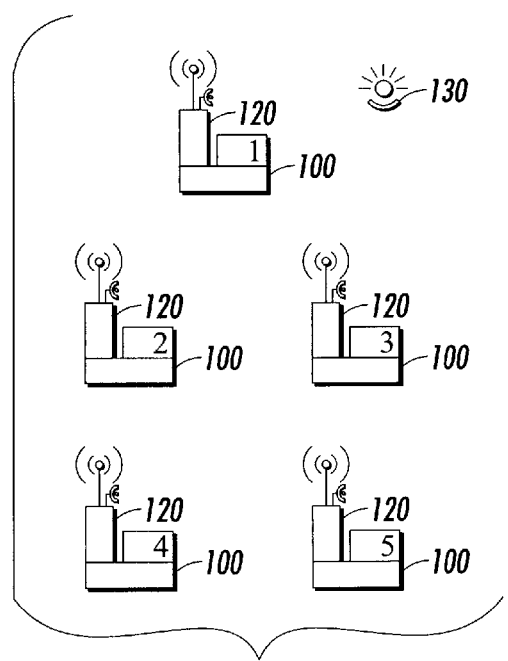
FIG. 4 depicts a fourth exemplary embodiment of a system according to this invention, including a decentralized multi-machine embodiment in which each machine has a message encoder and signal transmitter and receiver.

FIG. 4 shows a fourth exemplary embodiment of a system according to this invention that uses a decentralized scheme. As shown in FIG. 4, each machine 100 is provided with its own transmitter or transceiver 120. In various exemplary embodiments, one independent advantage of using a separate transmitter or transceiver 120 includes redundancy, such that, if a single transmitter or transceiver 120 breaks down, it does not disable more than one machine from being able to transmit signals to the user's receiver or transceiver 130.

In various exemplary embodiments of this invention, one advantage of the systems according to this invention is that the machine operator or a technician 300 can freely roam about the areas in which the machines 100 are located, while still remaining in touch with, or able to be notified of problems by, the machines 100. That is, to be able to receive messages from the machine 100, all the machine operator 300 has to do is use the receiver or transceiver 130. The receiver or transceiver 130 can be portable. For example, the receiver or transceiver 130 can be a simple headset with a control system. In this case, the headset 310 has earphones 312 and can optionally have a microphone 314. If the area(s) where the machines 100 are located are noisy, the headset 310 can be combined with ear protectors.

In various exemplary embodiments of this invention, another advantage of the systems according to this invention is that the machine operator 300 can be notified of diagnosed conditions even if the machines 100 are not visible to the operator 300.

If the diagnosed conditions are transmitted over different frequencies, or if different frequency transmissions are used for different machines 100, the user's transmitter or transceiver 130 can be provided with a transmitted frequency scanning system, like those used to scan police band or aircraft band frequencies, to readily locate a frequency over which a signal generated by one of the machines 100 is being transmitted. This allows the user 300 and/or the receiver or transceiver 130 to identify the diagnosed condition and/or the machine 100 which generated the signal in view of the one or more diagnosed conditions.

FIG. 5 shows a user 300 wearing an audio receiver or transceiver that implements the receiver or transceiver 130. The audio receiver or transceiver 130 is incorporated into a headphone to allow the user to keep the user's hands free. The audio receiver or transceiver 130 may include the optional microphone 314 so that the user 300 can transmit a signal back to the controller 102 of the machine 100 that generated the received signal, so that that machine 100 can take some action with respect to the condition of that machine 100. The received message can identify the problem or condition. Additionally, in various exemplary embodiments, the received message can include instructions to the user for responding to the problem or condition.

Figure 6:
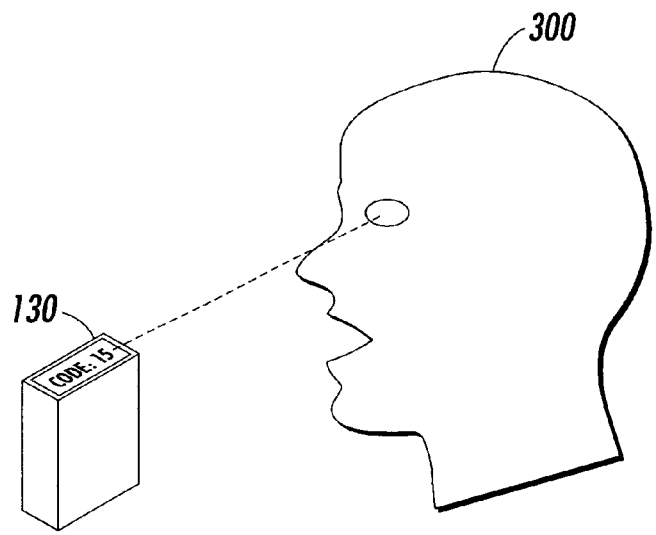
FIG. 6 depicts a second exemplary embodiment of the receiver usable in the first-fourth exemplary embodiments of a system according to this invention, including a machine user using a mobile receiver in the form of a visual pager usable to receive messages from a machine.

FIG. 6 shows a user 300 and a digital pager that implements the receiver or transceiver 130. The digital pager 130 displays a message generated by a machine 100, identifying the machine 100 that generated the message, the condition, and optionally, a suggested action to be taken by the user 300 with respect to the reported machine condition. The receiver or transceiver 130 can also be implemented using a wireless telephone which can play an audible message or display a written message, whether coded or uncoded. If a wireless telephone is used as the receiver or transceiver 130 by the user 300, the transmitter or transceiver 120 would have to be able to communicate with the local wireless telephone service, and possibly with the message encoder 108.

What is claimed is:

1. A system that communicates information to a remotely located receiver, comprising:
    a plurality of machines, each machine comprising at least one sensor, each sensor monitoring at least one aspect or condition of the machine and generating a signal representative of the status of the at least one sensed aspect or condition;
    at least one transmitter, each transmitter usable to input a signal from at least one of the at least one sensor and to transmit the at least one input signal on a determined frequency or a determined group of frequencies that is associated with a particular machine of the plurality of machines and which contains the at least one sensor that generated the at least one signal; and
    at least one remotely located receiver that receives the at least one transmitted signal, each remotely located receiver displaying, based on a received signal, a message to a user to allow the user to respond to the status of the at least one condition represented by the received signal.

2. The system of claim 1, further comprising for each at least one remotely located receiver a transmitter associated with that at least one remotely located receiver usable to send a signal from that remotely located receiver to the machine containing the sensor that generated the received signal to respond to the at least one sensed aspect or condition of the machine.

3. The system of claim 2, wherein the at least one sensed aspect or condition is at least one of a paper jam.

4. The system of claim 1, wherein each at least one transmitter is located in one of the plurality of machines.

5. The system of claim 1, wherein at least one of the at least one receiver is part of a transceiver.

6. The system of claim 1, wherein at least one of the at least one receiver includes a frequency scanner to determine the frequency transmitted.

7. A system that communicates information to a remotely located receiver, comprising:
    a plurality of machines, each machine comprising at least one sensor, each sensor monitoring at least one aspect or condition of the machine and generating a signal representative of the status of the at least one sensed aspect or condition;
    at least one transmitter, each transmitter usable to input at least one signal from at least one of the at least one sensor and to transmit the at least one input signal on a frequency that is associated with the machine containing the sensor that generated the at least one signal; and
    at least one remotely located receiver that receives the at least one transmitted signal, each remotely located receiver displaying, based on a received signal, a message to a user to allow the user to respond to the status of the at least one sensed aspect or condition represented by the received signal;
    wherein each at least one transmitter is located separately and apart from the plurality of machines.

8. A system that communicates information to a remotely located receiver, comprising:
    a plurality of machines, each machine comprising at least one sensor, each sensor monitoring at least one aspect or condition of the machine and generating a signal representative of the status of the at least one sensed aspect or condition;
    at least one transmitter, each transmitter usable to input at least one signal from at least one of the at least one sensor and to transmit the at least one input signal on a frequency that is associated with the machine containing the at least one sensor that generated the at least one signal; and at least one remotely located receiver that receives the at least one transmitted signal, each remotely located receiver displaying, based on a received signal, a message to a user to allow the user to respond to the status of the at least one sensed aspect or condition represented by the received signal;

wherein at least one of the at least one receiver is portable and contains protection for the human ear.

9. A system for communicating information to a remotely located receiver, comprising:

at least one sensor, each sensor associated with a machine to monitor an aspect of the machine and capable of generating a signal based on a status of the monitored aspect;

a controller connectable to at least one sensor so that when the controller receives at least one signal from the at least one sensor, the controller generates at least one second signal based on the at least one received signal, the at least one second signal corresponding to a voice message concerning the monitored aspect;

a transmitter capable of receiving the at least one second signal and transmitting the at least one second signal on a radio frequency;

at least one remotely located receiver capable of receiving the at least one transmitted second signal, each receiver wearable by a human and connected to at least one corresponding speaker;

wherein, when the transmitter transmits the at least one second signal, at least one of the at least one receiver is capable of receiving the at least one transmitted second signal and outputting the at least one received second signal to the speaker, the speaker converting the at least one received second signal into the at least one corresponding voice message that is perceivable and understandable to the human.

10. The system of claim 9, wherein the transmitter is located apart from a machine.

11. The system of claim 9, wherein the transmitter is located on one machine.

12. The system of claim 11, wherein the machine with the transmitter is a master, and any other machines are slaves.

13. The system of claim 9, wherein the at least one remotely located receiver further includes a transmitter.

14. The system of claim 13, wherein the machine further includes a receiver.

15. The system of claim 14, wherein the remote receiver is capable of transmitting a signal to the receiver included in the machine.

16. The system of claim 9, further including plurality of machines, each of which transmits the second signal at a different frequency.

17. The system of claim 16, wherein the remotely located receiver further includes a scanner to scan the frequencies transmitted by the plurality of machines.

18. A system for communicating information from a machine to a remotely located receiver, comprising:

at least one sensor, each sensor associated with a machine to monitor an aspect of the machine and capable of generating a signal based on a status of the monitored aspect;

a controller connectable to each at least one sensor such that when the controller receives at least one signal from at least one of the at least one sensor, the controller determines a radio frequency at which the at least one signal is to be transmitted;

a transmitter capable of receiving the at least one signal and transmitting the at least one signal at the determined radio frequency; and at least one remotely located receiver capable receiving the at least one transmitted signal, each receiver receiving at least one predetermined frequency;

wherein, when the transmitter transmits the at least one signal at the determined frequency, at least one of the at least one receiver is capable of receiving the at least one transmitted signal.

19. The system of claim 18, wherein the transmitter is located on one machine.

20. The system of claim 19, wherein the machine with the transmitter is a master, and any other machines are slaves.

21. The system of claim 18, wherein the at least one remotely located receiver further includes a transmitter.

22. The system of claim 21, wherein the machine further includes a receiver.

23. The system of claim 22, wherein the remote receiver is capable of transmitting a signal to the receiver included in the machine.

24. The system of claim 18, further including the plurality of machines, each of which transmits a second signal at a different frequency.

25. A system for communicating information from a machine to a remotely located receiver, comprising:

at least one sensor, each sensor associated with a machine to monitor an aspect of the machine and capable of generating a signal based on a status of the monitored aspect;

a controller connectable to each at least one sensor such that when the controller receives at least one signal from at least one of the at least one sensor, the controller determines a radio frequency at which the at least one signal is to be transmitted;

a transmitter capable of receiving the at least one signal and transmitting the at least one signal at the determined radio frequency; and at least one remotely located receiver capable receiving the at least one transmitted signal, each receiver receiving at least one predetermined frequency;

wherein, when the transmitter transmits the at least one signal at the determined frequency or group of frequencies, at least one of the at least one receiver is capable of receiving the at least one transmitted signal, and wherein the transmitter is located apart from a machine.

* * * * *